United States Patent [19]

Fur

[11] 4,114,767
[45] Sep. 19, 1978

[54] APPARATUS FOR THE STORAGE AND RETRIEVAL OF ITEMS

[76] Inventor: Nick Fur, 252 Camelot Drive, Burlington, Ontario, Canada, L7L 2G7

[21] Appl. No.: 789,701

[22] Filed: Apr. 21, 1977

Related U.S. Application Data

[63] Continuation of Ser. No. 690,003, May 26, 1976, abandoned.

[51] Int. Cl.² .............................................. B65G 1/06
[52] U.S. Cl. ............................... 214/16.4 A; 198/470; 198/744; 198/857
[58] Field of Search ............... 198/470, 857, 744, 746; 214/16.4 A, 16.4 B, 16.4 C, 16.4 R

[56] References Cited

U.S. PATENT DOCUMENTS

| | | | |
|---|---|---|---|
| 3,127,981 | 4/1964 | Sharpe | 198/744 |
| 3,658,173 | 4/1972 | Conti | 198/746 |
| 3,807,550 | 4/1974 | Taylor | 198/221 |
| 3,826,349 | 7/1974 | Stevenson | 198/744 |

FOREIGN PATENT DOCUMENTS

1,258,257  12/1971  United Kingdom.

Primary Examiner—Lawrence J. Oresky
Attorney, Agent, or Firm—Hirons & Rogers

[57] ABSTRACT

The invention provides an advancing member for use in a system for the so-called "cube" storage and retrieval of a large number of items, such as loaded pallets. Such a system employs a frame providing a plurality of parallel storage paths arranged in one-upon-the-other rows and side-by-side tiers. Each path provides a plurality of stations each able to store an item, and is provided with a respective advancing member which is motor-operated and extends substantially the full length of the path, the motor reciprocating the member back-and-forth. The advancing member carries for each station a pendulous lockable driving advancing means engagable with the item therein to move it to the next successive station as the member moves; it also carries a similar detector means, which may be constituted by the respective driving means, to detect the presence of an item at a station and unlock the preceding driving means so as to prevent the feeding of an item to an already occupied station. The entry and delivery ends of each path are provided with respective detectors to control movement of the advancing member to ensure that the delivering station is always occupied. The direction of feed of the advancing member is reversible.

16 Claims, 12 Drawing Figures

APPARATUS FOR THE STORAGE AND RETRIEVAL OF ITEMS

CROSS-REFERENCE TO RELATED APPLICATIONS

This application is a continuation of my application Ser. No. 690,003, filed 26th May, 1976, now abandoned.

FIELD OF THE INVENTION

The present invention is concerned with apparatus for the storage and retrieval of a large number of individual items, such as load-carrying pallets, and with systems employing such apparatus.

REVIEW OF THE PRIOR ART

There is in industry a constant thrust toward the efficient and economical storage and handling of large numbers of items. The development of such systems was advanced with the institution of standardised pallets, permitting otherwise non-standard size items to be handled, stored and retrieved as units of standard size. The employment of pallets has facilitated the development of so-called high-rise systems, in which a frame provides a large number of side-by-side tiers of pallet stations, into which the pallets (or other items) can be inserted, and from which they can be retrieved, by means of a special handling mechanism that moves along the access face of the frame.

For example, such systems are now well-known in which each tier extends to a height of 80 feet (24 meters) providing about 12 stations vertically, while of course the length of the frame is only limited by the number of stations that can be served efficiently by the handling mechanism. Two such frames are usually disposed face-to-face with a single handling mechanism between them, adjacent back-to-back frames being butted against one another to minimise the floor space thereby occupied.

DEFINITION OF THE INVENTION

It is an object of the present invention to provide a new advancing member for use in apparatus for the "cube" storage and retrieval of items, wherein the items are stored in a plurality of parallel storage paths each of which paths has a plurality of linearly spaced successive positions, each position being adapted to receive an item.

It is also an object to provide a system employing such a member.

In accordance with the present invention there is provided an advancing member for an item storage and retrieval system comprising at least one storage path having therealong a plurality of spaced successive stations each adapted to receive an item, the member comprising: (a) an elongated support member extending over a plurality of stations and mountable for reciprocating movement in the path parallel to the direction of movement of items therein; (b) a plurality of pendulous item engaging and driving members each pivotally mounted on the support member to move through a respective item station upon the said reciprocating movement of the support member and to normally pivot under gravity into a driving position in which it can engage an item at the station to drive the engaged item to the next succeeding station in the path; (c) a locking member for each engaging and driving member engagable therewith to lock the member in said driving position during advancing movement of the advancing member, while permitting movement of the driving member to an inoperative position during reverse movement of the advancing member; (d) a plurality of pendulous item detector members each pivotally mounted on the support member at or adjacent to a respective station to normally pivot under gravity into an item engaging position; and (e) connecting means each connected between a respective item detector and the locking member of the immediately preceding driving member and movable longitudinally of the support member whereby upon the presence of an item in the said immediately succeeding station the item detector moves the said locking member by the said longitudinally movable connecting means to an inoperative position during advancing movement of the advancing member.

Preferably the driving engaging member for each station also constitutes the detector member for the next preceding station in the direction of movement of items in the path.

The direction of driving of the advancing member for each path may be reversible and the driving engaging member for each station also constitutes the detector member for the next preceding stations in the two directions of movement of items in the path.

In the form of storage in which the apparatus of the invention is employed no aisles are required between the tiers of storage paths, items being placed into the receiving position of the respective path at one face of the storage frame, and then being fed along the path until the dispensing or delivering position of the path is reached at the other face of the frame, from which it is readily retrieved. Such a form of storage may be called colloquially "high-rise cube storage" and, for example, can provide a saving of about 40% of required floor area over the aisle-using systems known hitherto.

DESCRIPTION OF THE DRAWINGS

Particular preferred embodiments of the invention will now be described, by way of example, with reference to the accompanying diagrammatic drawings, wherein.

DESCRIPTION OF THE PREFERRED EMBODIMENTS

Figure 1:
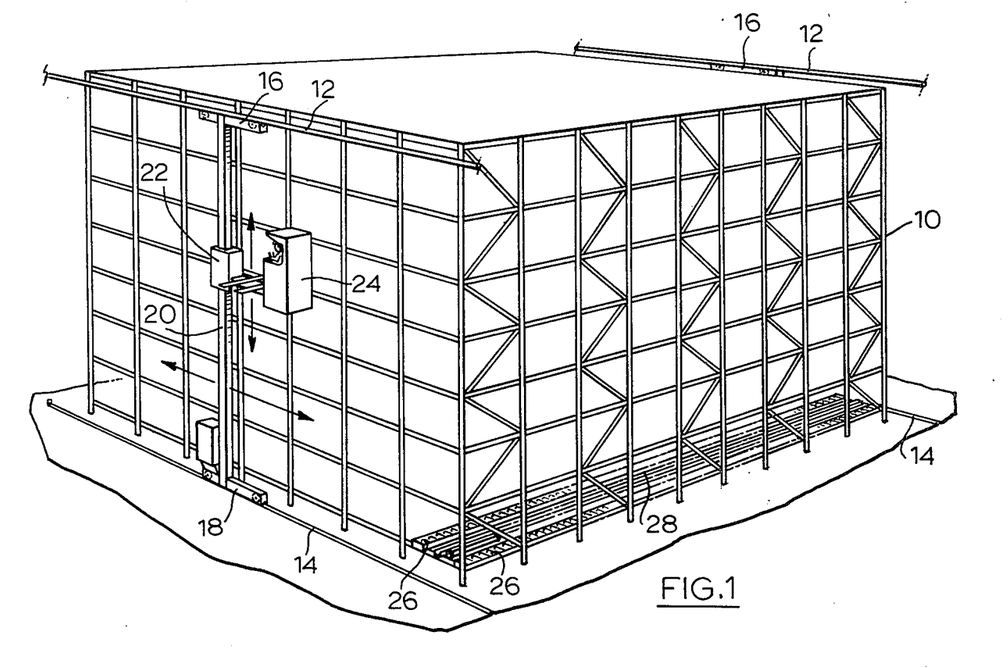
FIG. 1 is a perspective view of an entire "cube" storage system to illustrate the general arrangement thereof.

Referring now specifically to FIG. 1, a complete item storage and retrieval system is illustrated therein comprising a metal frame 10 providing a large number of parallel storage and retrieval paths. By way of example only, the frame is shown as comprising 49 such paths, although it will be apparent that any other number may be provided. The frame may be regarded as consisting of seven rows each of seven side-by-side paths, or as consisting of seven side-by-side tiers of seven paths one-upon-the-other; for convenience the latter description will be used.

Again by way of example only each path is illustrated in FIG. 1 as providing nine successive stations each for the reception of a respective item, although again any number of stations can be employed from a minimum of three to a maximum that will be determined by the designer of the specific system.

The system that is particularly described is intended for use with pallets and that word may therefore be used in this specific description interchangeably with "items". It will be apparent that other items could instead be handled, such as bins and containers of appropriate size.

The frame has two parallel faces at which all the parallel paths begin and terminate, and an item insertion and retrieval machine is provided at each of these faces. The actual construction of these insertion and retrieval machines is not pertinent to the present invention, and for convenience only they are illustrated as consisting of upper and lower rails 12 and 14 on which respective trolleys 16 and 18 run and mount a vertical member 20 for movement parallel to the respective frame face. The vertical member 20 in turn mounts for vertical movement a carriage 22 including an operator's booth 24. This carriage includes any suitable mechanism able to receive thereon the items to be stored and, when the carriage has moved to the entry end of the selected path, to deliver the item therefrom into the immediately adjacent endmost entry or receiving station of the path. Both machines are also able to withdraw an item from the endmost immediately adjacent storage station with which it is aligned, so that items can be moved in either direction through the stack.

Figure 2:
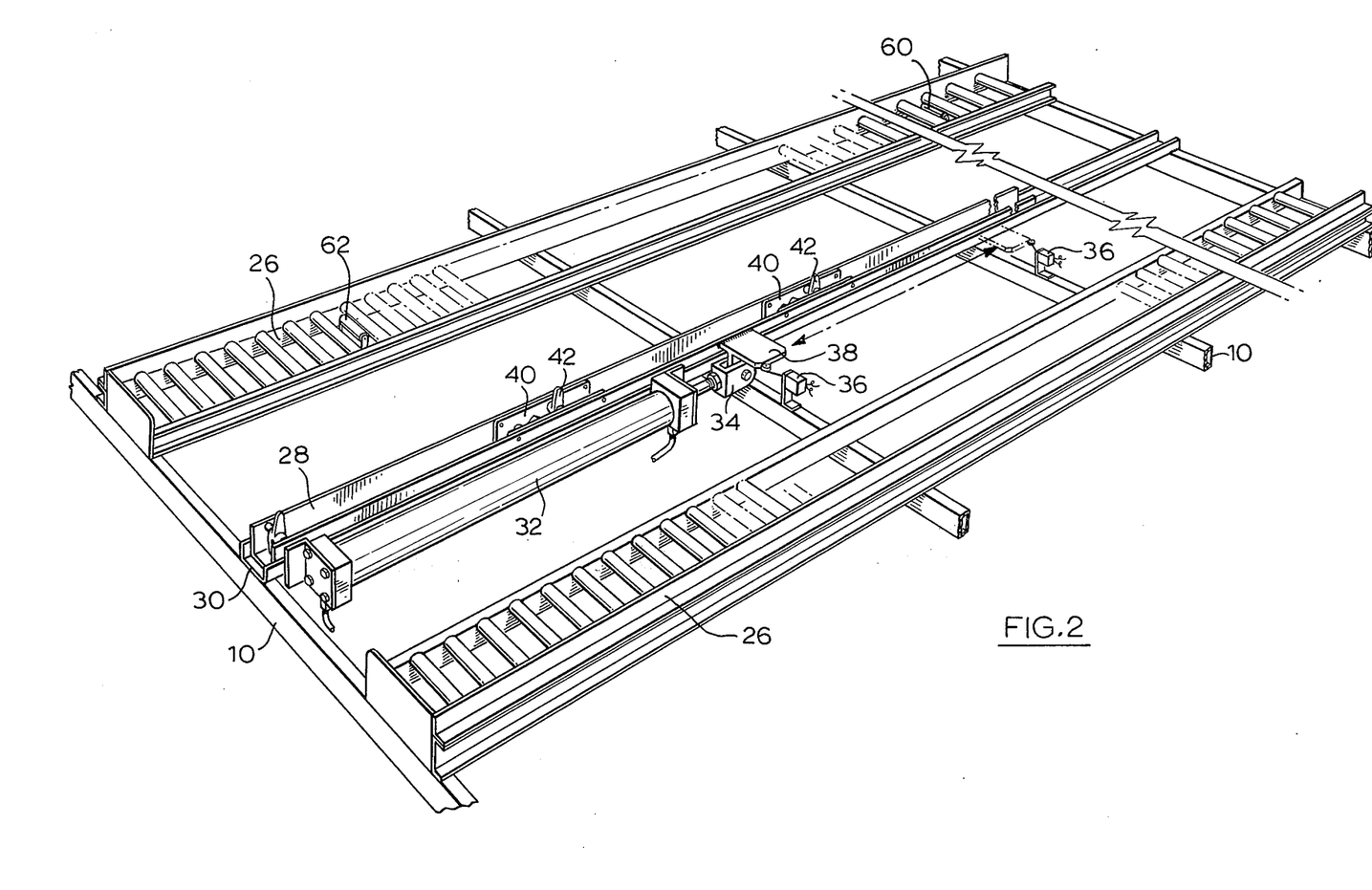
FIG. 2 is another perspective view of a single path of the system of FIG. 1, drawn to a larger scale than FIG. 1.
Figure 3:
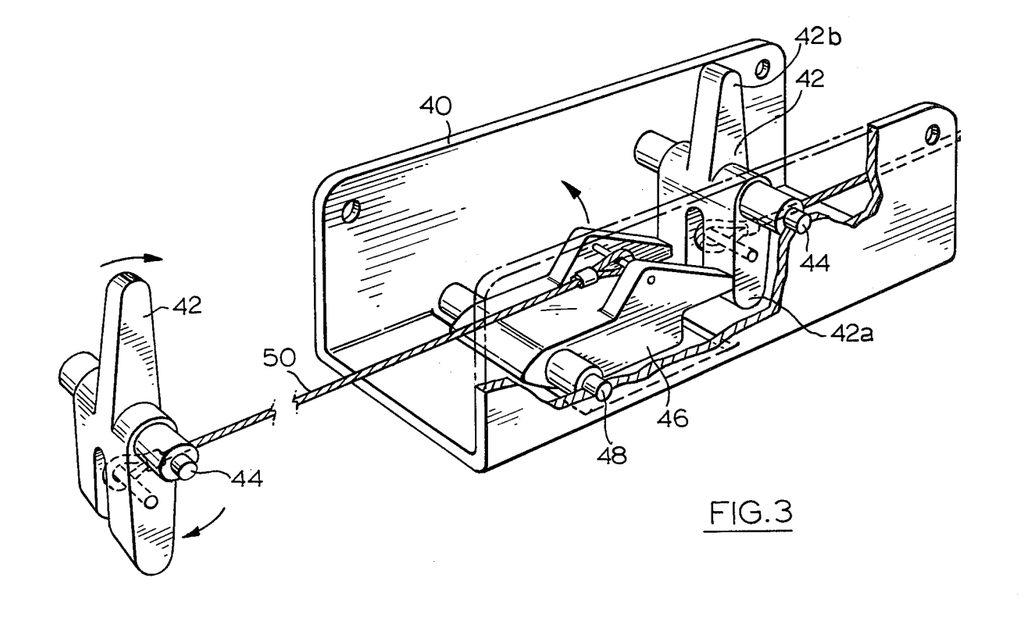
FIG. 3 is a further perspective view of a single detector/driving unit of the path of FIG. 2, drawn to a still larger scale.

Each path is provided with two spaced roller conveyors 26, on which the pallets or other items can move along the path with a minimum of effort. Each path is also provided with an advancing member comprising in this embodiment an elongated movable channel member 28 mounted for free sliding movement in another channel member 30 which is rigidly fastened to the frame 10. The length of the movable member 28 is shorter than the path length by almost the distance between two immediately successive stations, as will be seen from FIGS. 4 and 6, and it is reciprocated back-and-forth through a distance just greater than the said distance by a double-acting pneumatic piston and cylinder motor 32 (FIG. 2) having the cylinder fixed to the fixed member 30, and thereby to the frame 10, while the piston is connected to the movable member 28 via a yoke 34. The stroke of the motor, and thus of the member 28, in their reciprocating movement is determined by limit switches 36 that are engaged by bracket 38 to which the yoke 34 is connected.

The movable member 28 is provided at the locations along its length corresponding to the rear edges of the respective stations with readily removable channel mounting parts 40 fixed thereto. Each part 40 mounts a respective driving engaging member constituted by a pendulous dog 42 pivotally mounted about a pivot pin 44, the bifurcated bottom end 42a of each dog being substantially heavier than the top end 42b, so that the dogs are urged by the force of gravity to normally return to the driving position, in which their upper ends 42b extend vertically upwards above the level of the roller conveyors 26 to engage the items thereon. Each part 40 also pivotally mounts forwardly of the respective dog 42 a locking member 46 which in a horizontal, lower operative position thereof, toward which it normally pivots under gravity, engages with the dog bottom end 42a, the member being pivotally mounted for movement about a pivot pin 48 to an elevated inoperative or disabled position. The highest elevated position to which the locking member can rise is determined by engagement of its tail end 46a with the floor of the member 40. In its lower operative position each locking member locks its respective driving dog against rotation (in the clockwise direction as seen in these drawings) as it engages the item in the respective station to drive the item to the next succeeding station, while permitting the dog to rotate freely anticlockwise to a disabled position (shown in broken lines to the right in FIG. 5) as the advancing member 28 moves the dog backwards underneath the next succeeding item, in which disabled position it cannot move that last-mentioned item rearwards. In the elevated disabled position of the locking member 46 the driving dog 42 pivots freely about its axis in both directions and is not able to drive the item in either direction.

Each locking member 46 is under the control of a pendulous pivotally-mounted detector member in the immediately preceding station, this detector member normally pivoting under gravity to engage an item on the conveyor, the member detecting the presence of an item thereon and actuating the locking member to which it is connected, in this embodiment by a flexible cable 50, to prevent the controlled dog from driving another item into the already-filled station. The detector member at the exit station consists of a freely pivoted dog 42, no locking member being required with this embodiment at this particular location. In this embodiment each driving dog is arranged to function also as the detector member for the next preceding station, and to that end is therefore operatively connected by a flexible cable 50 with the respective locking member.

The pneumatic motor 32 is fed with high pressure air as required from a source 52 under the control of a relay 54 under the control of the switches 36. The relay is also controlled by two switches 56 and 58, the switch 56 being controlled by an item detector constituted by roller 60 located at the path entry in one roller conveyor, while the switch 58 is controlled by another item detector roller 62 located at the path exit.

Figure 4:
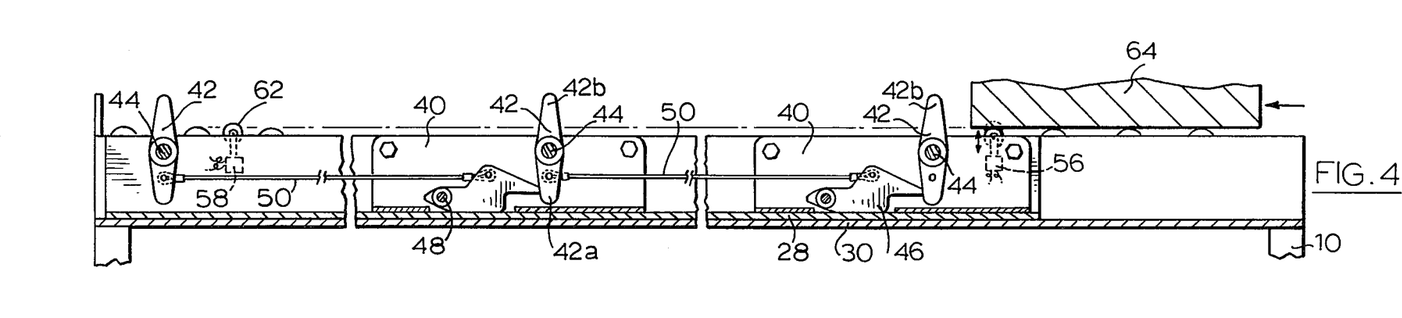
FIGS. 4 through 6 are longitudinal side elevations of the advancing member of the system of FIG. 2 to show its mode of operation.
Figure 5:
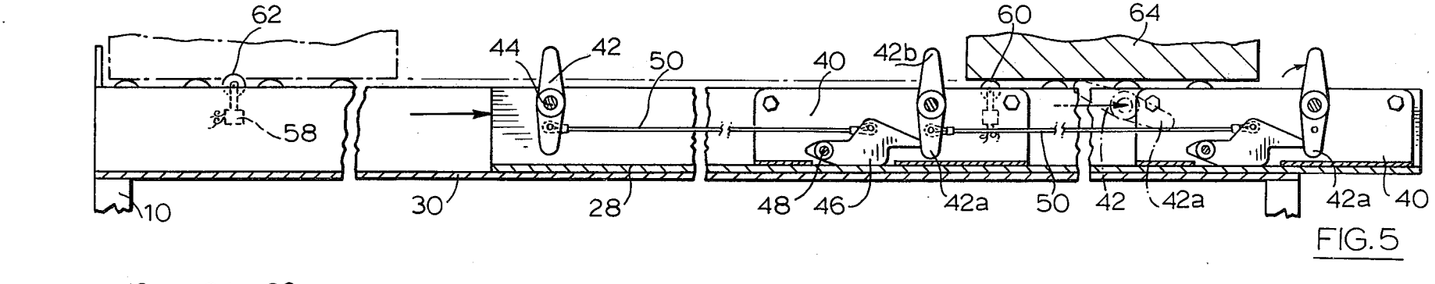
Figure 6:
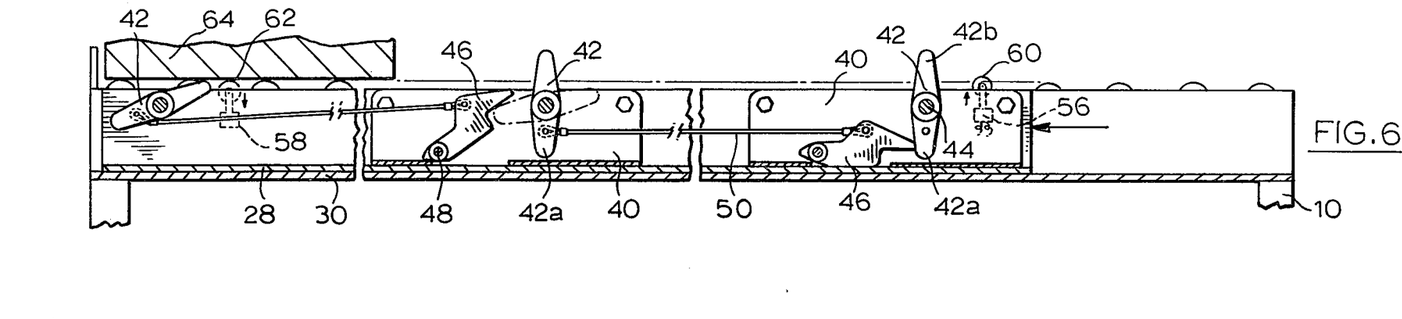

Referring now especially to FIGS. 4 to 6, in operation an item 64 placed at the entry end of the path, causes operation of the motor 32 via the switch 56 to feed the item along the conveyors. Since the switch 58 indicates that the exit station is empty this feeding will continue until the switch 58 is actuated, whereupon operation of the advancing member ceases. The item 64 is now ready at the exit end for immediate retrieval or removal by the exit machine. Upon removal of an item from the exit end, provided there is another item in the path, the switch 62 causes an operation of the motor to fill the endmost position again. If the entry station is empty while the exit station is occupied the placing of an item into the entry station will cause only a single operation of the advancing member to move the item to the next succeeding station, when the detector 60 and switch 56 are unactuated. The placing of another item at the entry station causes another single operation with the two items moving simultaneously, and so on.

As the advancing member moves to the left as seen in the Figures the locked dogs 42 will engage any item in the respective station and push it into the next succeeding station. As the advancing member reciprocates backwards the dogs can pivot freely to pass beneath the preceding item without attempting to drive it backwards, until they reach the rear ends and can swing back into the operative position under the force of gravity. The detection of an item in the succeeding station will unlock the dog so that it cannot drive on the next forward stroke. Counting devices may be provided in known manner to count the number of items that are contained in each path, and also to count the number of items that have passed through each path. They may also be further arranged to indicate the number of empty stations available in each path.

As described above, each dog 42 is urged by gravity to return to the upright driving position, while each locking member 46 is similarly urged to the locking position. Each locking member has vertical faces engaging corresponding vertical faces of the dog 42, so that the driving force applied by the dog has no appreciable upward component. However, as soon as the locking member has lifted only a few degrees of arc from the locking position there is a substantial upward component exerted, and very rapid unlocking is achieved, the lower end 42a of the dog lifting the locking member. Conversely as soon as the locking member is released to the locked position its weight is effective to push the dog quickly back into its locked upright driving position.

Figure 7:
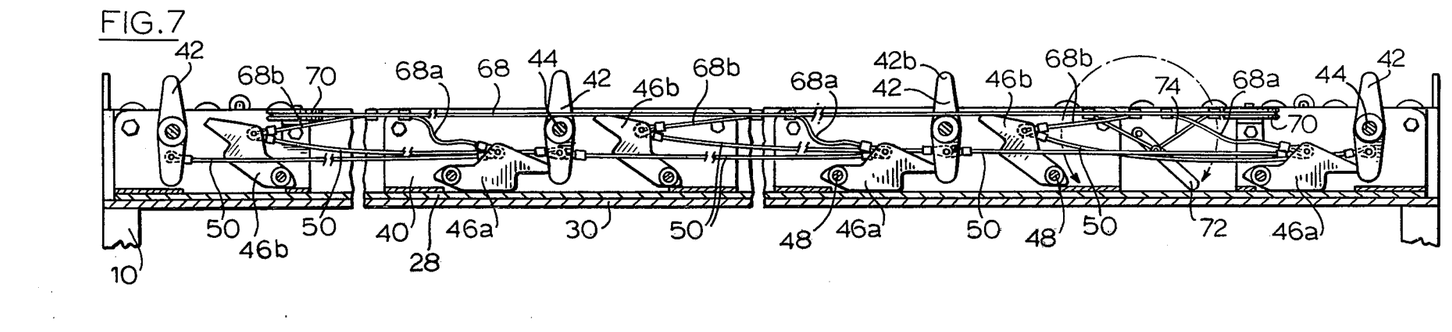
FIG. 7 is a side elevation similar to FIG. 4 to illustrate an advancing member permitting reversal of the direction of movement of items through the path.
Figure 8:
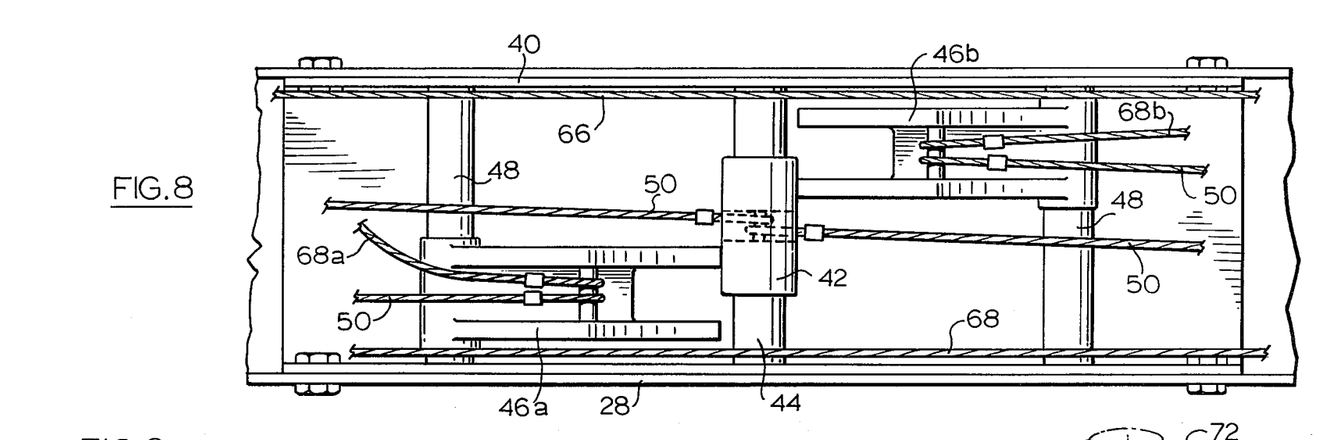
FIG. 8 is a plan view of a detector/driving unit of the advancing member of FIG. 7, drawn to a larger scale.

In some systems it may be desired to be able to reverse the direction of movement of items in each path under the control of an operator, and a construction permitting this is illustrated by FIGS. 7 and 8. Each driving dog 42 is provided with two alternatively operable locking members 46 and 46b, each of which in its operative position will cause the dog to drive in its respective direction, while permitting it to "ratchet" in the opposite direction. The locking members 46a are each connected to one run 66 of an endless flexible cable by respective cable sections 68a while the alternatively operable members 46b are each connected to the run by respective cable sections 68b. The cable passes around two end pulleys 70 and is movable by a pivoted operator's lever 72 connected thereto by a side cable 74. The advancing member illustrated by FIG. 7 is set to advance items from right to left and the lever 72 is moved to a position shown in solid lines in which all the cable sections 68a are slack, while the cable sections 68b are all taut, so that the locking members 46b are lifted away from the dogs 42, so that they are permanently disabled from operation. The arrangement is reversed when the lever 72 is in the other extreme position shown in broken lines, so that movement of the lever is all that is required to reverse the direction of feed. In this embodiment each endmost detector member 42 must be provided with a respective locking dog for the respective direction of operation.

Figure 9:
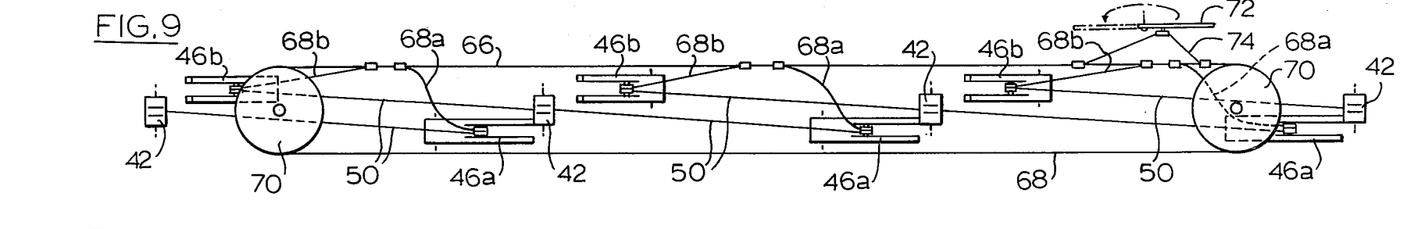
FIG. 9 is a diagrammatic plan view of the embodiment of FIG. 7 illustrating the control cable connections providing the reversing function.

In an alternative embodiment of FIG. 9 separate detector dog means 42 and driving dog means 76 are provided for each station. Each detector dog 42 is connected by a rigid connecting rod 78 to a relay member 80 in the next succeeding station, this relay member being pivoted in the respective channel part about the same axle 44 as the detector dog of that station. The relay member is then operatively connected by a flexible connection 82, such as a cable or as illustrated a chain to a respective pivoted, gravity-biased driving dog.

Figure 10:
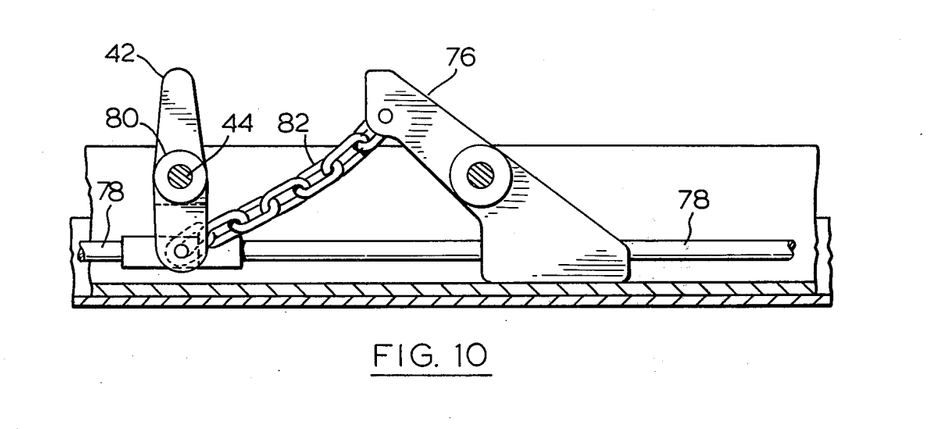
FIG. 10 is a side elevation similar to FIG. 4 of a further embodiment.
Figure 11:
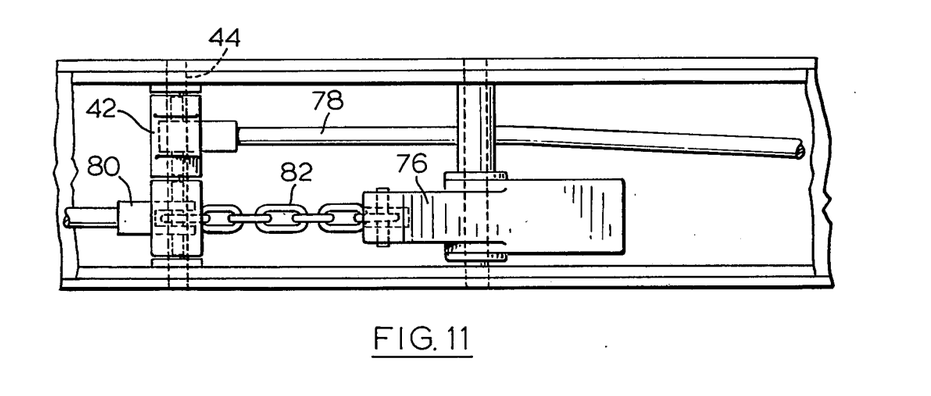
FIG. 11 is a plan view of the embodiment of FIG. 10.
Figure 12:
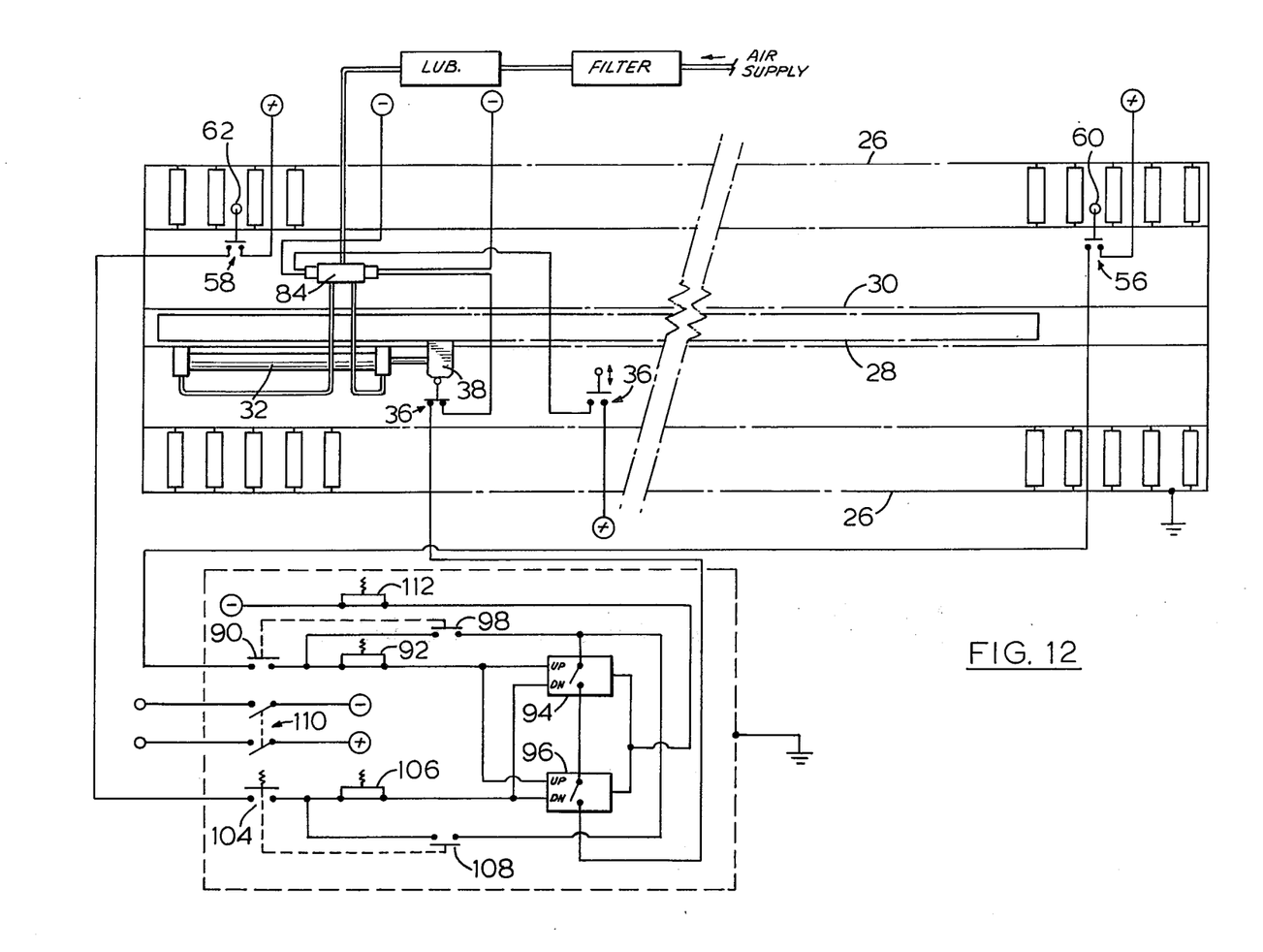
FIG. 12 is a schematic combined pneumatic/electric circuit for each path of the system.

Referring now to FIG. 10 the motor 32 is supplied with its operating air via an electrically controlled valve 84. An item placed at the entry end of the conveyor 26 depresses detector roller 60 closing normally-open switch 58, thereby actuating a time delay switch 90 which closes about 20 seconds after the actuation signal is received. This delay period gives the operator time to manoeuvre the item on the conveyor or even remove it if it is improperly placed. Another normally-closed switch 92 transmits a counting impulse to counters 94 and 96 and immediately opens. Contacts 98 of the switch 90 also close and can supply a motor operating signal to the valve 80 through switches in the counters 94 and 96, which switches are only closed if the counters indicate that an item is present in the path and the path is not completely full. When an item is removed from the exit end switch 58 controlled by detector roller 62 transmits an actuating signal via switch 104 which provides the same time delay as with the switch 90 for the same reason. Normally-closed switch 106 transmits a counting signal to the counters 94 and 96 and immediately opens. Other contacts 108 of the switch 104 close after the time delay to send an operating signal via the counters 94 and 96 to the valve 84 to again actuate the motor 32. The motor 32 is therefore actuated as described above until an item reaches the exit end and stops the motor.

The electrical circuit is switched on and off by main switch 110. If there is a failure of the power supply and subsequent re-establishment, a false count signal may be given to the counters and to avoid this a delay-close switch 112 is included; this switch closes after a time delay of about one minute after re-application of power and prevents powering of the counters until the remainder of the circuit has become operative and stabilised.

I claim:

1. An advancing member for an item storage and retrieval system comprising at least one storage path having therealong a plurality of spaced successive stations each adapted to receive an item, the member comprising:

(a) an elongated support member extending over a plurality of stations and mountable for reciprocating movement in the path parallel to the direction of movement of items therein;

(b) a plurality of pendulous item engaging and driving members each pivotally mounted on the support member to move through a respective item station upon the said reciprocating movement of the support member and to normally pivot under gravity into a driving position in which it can engage an item at the station to drive the engaged item to the next succeeding station in the path;

(c) a locking member for each engaging and driving member engageable therewith to lock the member in said driving position during advancing movement of the advancing member, while permitting movement of the driving member to an inoperative position during reverse movement of the advancing member;

(d) a plurality of pendulous item detector members each pivotally mounted on the support member at or adjacent to a respective station to normally pivot under gravity into an item engaging position; and (e) connecting means each connected between a respective item detector and the locking member of the immediately preceding driving member and movable longitudinally of the support member, whereby upon the presence of an item in the said immediately succeeding station the item detector moves the said locking member by the said longitudinally movable connecting means to unlock the respective driving member so that it will move to an inoperative position during advancing movement of the advancing member.

2. An advancing member as claimed in claim 1, wherein the driving engaging member for each station also constitutes the detector member for the next preceding station in the direction of movement of items in the path.

3. An advancing member as claimed in claim 1, wherein the direction of driving of the advancing member for each path is reversible
and the driving engaging member for each station also constitutes the detector member for the next preceding stations in the two directions of movement of items in the path.

4. An advancing member as claimed in claim 1, wherein the direction of driving of the advancing member for each path is reversible, and each driving engaging member is provided with two alternatively operable locking members each engagable when operative with the driving engaging member to lock the member in said driving position during advancing movement of the advancing member in its respective direction, while permitting movement of the driving member to an inoperative position during reverse movement of the advancing member.

5. An advancing member as claimed in claim 4, wherein means for operatively connecting the said locking members is an endless flexible cable, all the locking members for one direction of movement of the advancing member being connected to one run of the cable, and all the locking members for the opposite direction of movement being connected to the other run of the cable.

6. An advancing member as claimed in claim 1, wherein the longitudinally operable connecting means connecting each locking member to its respective detector member is a flexible cable extending along the advancing member.

7. An advancing member as claimed in claim 1, wherein each locking member comprises a pivoted member normally movable by gravity into engagement with the respective driving member to lock it in the said driving position, and lifted by the respective detector member against gravity to unlock the driving member.

8. An advancing member as claimed in claim 7, wherein each locking member is pivoted to the support member forwardly of the respective driving member and extends rearwardly to engage the driving member beneath the pivot of the driving member with the support member.

9. An advancing member as claimed in claim 8, wherein the engagement between each driving member and its locking member is such that upon unlocking of the driving member engagement thereof with an item at the station moves it to move the locking member further away from the locking position.

10. An advancing member as claimed in claim 1, wherein the elongated support member comprises a first elongated part sliding freely on a second part adapted to be fixedly mounted to a storage frame.

11. An advancing member as claimed in claim 10, wherein means for moving the first elongated part relative to the second part comprise a double acting pneumatic piston and cylinder motor connected between the two parts, the stroke of the motor being just greater than the distance between two successive stations.

12. An advancing member as claimed in claim 1, wherein each driving member and its respective locking member or members are pivotally mounted on a respective submember that is mounted on the elongated support member.

13. An item storage and retrieval system comprising:
(a) a storage frame having two parallel faces and providing a plurality of parallel storage paths for the storage and retrieval of the said items;
(b) each storage path extending from one to the other of the said two parallel faces and providing a plurality of linearly equally-spaced successive stations each adapted to receive a respective item;
(c) means at one of the said parallel frame faces for inserting an item into a selected path, and means at the other of the said parallel frame faces for retrieving an item from a selected path;
(d) an advancing member for each path movable in the path a distance equal to the spacing between two successive stations; each advancing member comprising:
(e) an elongated support member extending over a plurality of stations and mounted for reciprocating movement in the path parallel to the direction of movement of items therein;
(f) a plurality of pendulous item engaging and driving members each pivotally mounted on the support member to move through a respective item station upon the said reciprocating movement of the support member and to normally pivot under gravity into a driving position in which it can engage an item at the station to drive the engaged item to the next succeeding station in the path;
(g) a locking member for each engaging and driving member engageable therewith to lock the member in the said driving position during advancing movement of the advancing member, while permitting movement of the driving member to an inoperative position during reverse movement of the advancing member;
(h) a plurality of pendulous item detector members each pivotally mounted on the support member at or adjacent to a respective station to normally pivot under gravity into an item engaging position; and
(i) connecting means each connected between a respective item detector and the locking member of the immediately preceding driving member and movable longitudinally of the support member, whereby upon the presence of an item in the said immediately succeeding station the item detector moves the said locking member by the said longitudinally movable connecting means to unlock the respective driving member so that it will move to an inoperative position during advancing movement of the advancing member.

14. A system as claimed in claim 13, wherein both of the said means at the storage frame parallel faces is operative to both insert and to retrieve items from the stack, and the direction of driving of the advancing member for each path is reversible by an operator.

15. A system as claimed in claim 13, wherein each path includes a detector at the entry and exit stations at the respective ends of the path, the detector at the entry station of the path being operative to cause operation of the advancing member to feed an item at the entry station toward the exit station, and the detector at the exit station being operative to discontinue operation of the advancing member upon receipt of an item at the exit station.

16. A system as claimed in claim 13, wherein the said items are pallets and each path is provided with a pair of spaced roller conveyors on which the pallets move, the advancing member being mounted for movement between the spaced conveyors.

* * * * *